United States Patent
Mason

(10) Patent No.: US 12,299,086 B2
(45) Date of Patent: May 13, 2025

(54) ASPIRATING DETECTOR DEVICE FUNCTIONALITY LICENSING

(71) Applicant: Honeywell International Inc., Charlotte, NC (US)

(72) Inventor: Murray Mason, Rowville (AU)

(73) Assignee: Honeywell International Inc., Charlotte, NC (US)

( * ) Notice: Subject to any disclaimer, the term of this patent is extended or adjusted under 35 U.S.C. 154(b) by 248 days.

(21) Appl. No.: 17/969,267

(22) Filed: Oct. 19, 2022

(65) Prior Publication Data
US 2024/0134943 A1 Apr. 25, 2024
US 2024/0232299 A9 Jul. 11, 2024

(51) Int. Cl.
*G08B 17/10* (2006.01)
*G06F 21/10* (2013.01)
*G06Q 50/26* (2012.01)
*H04W 12/00* (2021.01)

(52) U.S. Cl.
CPC ......... *G06F 21/105* (2013.01); *G06Q 50/265* (2013.01)

(58) Field of Classification Search
None
See application file for complete search history.

(56) References Cited

U.S. PATENT DOCUMENTS

| | | | |
|---|---|---|---|
| 11,080,989 B2 | 8/2021 | Wolff | |
| 2004/0125077 A1* | 7/2004 | Ashton | G06F 3/038 345/156 |
| 2010/0251346 A1* | 9/2010 | Dumais | G06F 21/10 726/5 |
| 2010/0271219 A1* | 10/2010 | Lang | G08B 17/10 340/628 |
| 2012/0033804 A1* | 2/2012 | Soquet | H04N 21/2383 380/28 |
| 2016/0350519 A1 | 12/2016 | Pattyn | |
| 2018/0242379 A1 | 8/2018 | Turon et al. | |
| 2020/0065454 A1* | 2/2020 | Lei | G06K 7/1413 |
| 2020/0168057 A1* | 5/2020 | Sloo | G08B 29/26 |
| 2020/0380836 A1* | 12/2020 | Harrison | G08B 21/14 |
| 2021/0036932 A1* | 2/2021 | Asbi | G06F 9/44526 |
| 2021/0234973 A1 | 7/2021 | Hou | |
| 2021/0243021 A1* | 8/2021 | Fourquin | H04L 9/0866 |
| 2021/0365566 A1* | 11/2021 | Souissi | H04L 9/0861 |

FOREIGN PATENT DOCUMENTS

KR 10-2082152 B1 2/2020

* cited by examiner

*Primary Examiner* — Christopher B Robinson
(74) *Attorney, Agent, or Firm* — Brooks, Cameron & Huebsch, PLLC

(57) ABSTRACT

Aspirating detector device functionality licensing is described herein. One system includes an aspirating detector device configured to display a machine-readable code via an interface responsive to an input and a mobile device configured to scan the code, establish a connection with a remove server responsive thereto, and receive a license key corresponding to an aspirating detector device functionality from the remote server via the connection and wherein the aspirating detector device is configured to enable the functionality responsive to an entry of the code via the interface.

20 Claims, 2 Drawing Sheets

ASPIRATING DETECTOR DEVICE FUNCTIONALITY LICENSING

TECHNICAL FIELD

The present disclosure relates to methods, devices, and systems for aspirating gas detector device functionality licensing.

BACKGROUND

Large facilities (e.g., buildings), such as commercial facilities, office buildings, hospitals, and the like, may have an alarm system that can be triggered during an emergency situation (e.g., a fire) to warn occupants to evacuate. For example, an alarm system may include a control panel (e.g., a fire control panel) and a plurality of aspirating detector devices located throughout the facility (e.g., on different floors and/or in different rooms of the facility) that detect a hazard event, such as the presence of a gas of concern and/or smoke generation (e.g., as the result of a fire or otherwise). The aspirating detector can transmit a signal to the control panel in order to notify a building manager, occupants of the facility, emergency services, and/or others of the hazard event via alarms or other mechanisms.

DETAILED DESCRIPTION

Figure 1:
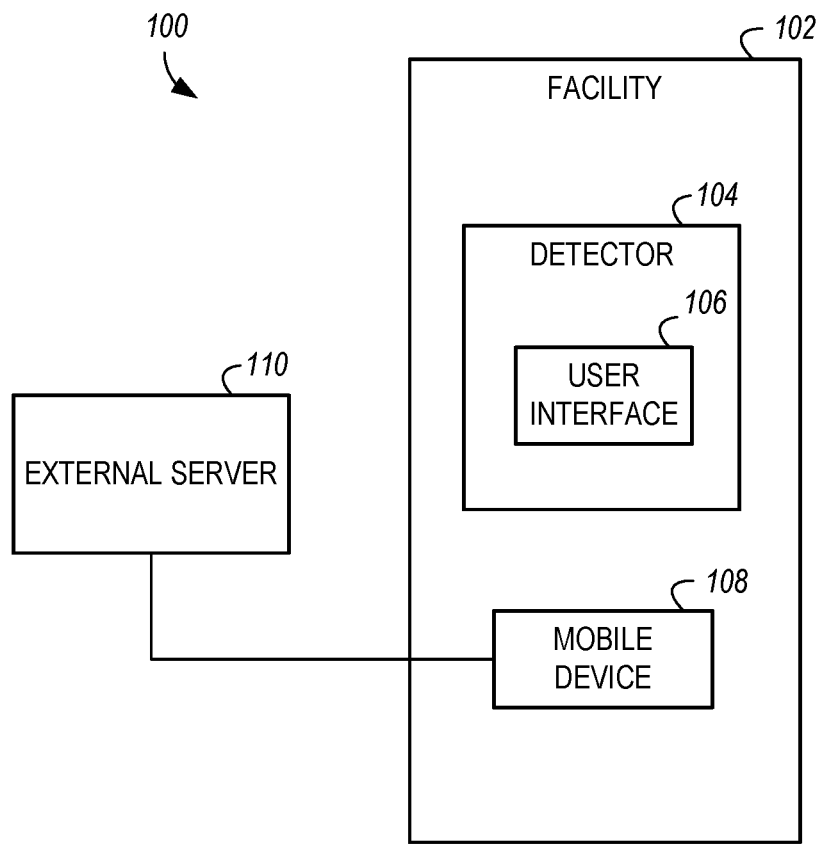
FIG. 1 is a diagram of an example system for aspirating detector device functionality licensing in accordance with the present disclosure.

Methods, devices, and systems for aspirating detector device feature licensing are described herein. One system includes an aspirating detector device configured to display a machine-readable code via an interface responsive to an input and a mobile device configured to scan the code, establish a connection with a remove server responsive thereto, and receive a license key corresponding to an aspirating detector device functionality from the remote server via the connection, wherein the aspirating detector device is configured to enable the functionality responsive to an entry of the code via the interface.

An aspirating detector device (sometimes referred to herein simply as "detector") can be utilized in a facility to detect a hazard event by detecting the presence of one or more gases of concern and/or smoke. Gases of concern are gases harmful to health and/or gases that pose dangers. For example, gases of concern include carbon monoxide, carbon dioxide, and/or volatile organic compounds (e.g., total volatile organic compounds). The detector can draw gas (e.g., air, via a blower) from the facility into a sensor through a network of pipes throughout the facility. The sensor can sample the gas in order to determine whether the gas includes gas(es) of concern and/or smoke particles. In response to detection of a gas of concern and/or smoke particles, the aspirating smoke detector device can transmit a signal to a control panel in the facility to signal such detection.

While detectors may be capable of being networked to other (e.g., external) devices, for security reasons it may be undesirable to connect a detector to the Internet, for instance. A cyberattack through a connection to the Internet could have very negative effects on a facility's fire system. This presents problems, however, because users may desire to configure and/or maintain a detector, which typically involves connecting to such services via an external connection. In addition, there may be various functionalities of a detector that can be selectively enabled through one or more licensing agreements. In an example, a detector may include hardware components utilized for detecting lithium gas but may not be initially programmed and/or configured to do so. In some embodiments, a user who wants their detector to detect lithium gas may be able to license such a functionality (e.g., for a particular period of time) from an entity that provided and/or manages the detector. Again, however, the intentional lack of an external connection can make this process frustrating.

Embodiments of the present disclosure allow configuration, maintenance, and/or functionality licensing of detectors that lack a connection outside of the facilities in which they are installed. Embodiments herein can facilitate the deployment of services that generate recurring revenues for a commercial entity. In some embodiments, for instance, a user can cause a machine-readable code to be displayed via an interface of the detector. The code can be a quick response (QR) code, for instance. This code can be scanned using a phone or other mobile device. Scanning the code can cause the mobile device to establish a connection with an external server. Once connected, the mobile device can be used to browse functionalities available for the detector. Any desired functionalities can be indicated via an interface of the mobile device. Upon the completion of a license agreement and/or the payment of any applicable fees, the external entity can communicate a license key to the mobile device. The user can read and input the received key into the detector which can validate the key and enable the desired functionalities.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 302 in FIG. 3.

FIG. 1 is a diagram of an example system 100 for aspirating detector device functionality licensing in accordance with the present disclosure. As shown in FIG. 1, the system 100 includes a detector 104 installed in a facility 102. The detector 104 can include a user interface (UI) 106. The UI 106 can include a display. In some embodiments, the display can be an organic light-emitting diode (OLED) display. The UI 106 can receive inputs. In some embodiments, for instance, the UI can include a keypad. A mobile device 108 can be present within the facility 102. The mobile device 108 can communicate wirelessly with an external server 110. The external server 110 can be housed within the facility 102 in some embodiments.

In an example, a maintenance technician associated with (e.g., employed by) the facility 102 may seek to enable a functionality that is not currently enabled on the detector 104. Functionalities, as described herein, include capabilities, programs, services, modes of operation, etc. Functionalities can include time-limited functionalities that are enabled for a finite period of time corresponding to a duration of a license. Functionalities can include maintenance support services. Functionalities can include remote configuration services. Functionalities can include analytics services. Stated differently, a functionality of a detector is a functionality that can be enabled and/or disabled by the entry of a particular key (discussed below) via the UI 106. As a result, various functionalities of aspirating detectors can be licensed rather than purchased up front. Depending on a facility's needs, savings can be realized by customers and continuing revenue streams can be realized by providers.

In the example, a high fan speed setting is not currently enabled on the detector 104 and the fan operates at a speed less than desired. The technician can enable the high fan speed setting using embodiments herein. For example, the user can request that a machine-readable code (sometimes referred to herein simply as "code") be displayed via the UI 106. The request can be made using the UI 106 (e.g., a touch screen and/or keypad of the UI 106). In some embodiments, a particular key, or series of keys, can be pressed to cause the code to be displayed. The code can be a QR code, though embodiments herein do not limit the code to a particular type.

The code can be generated cryptographically based on an identifier (e.g., serial number) of the detector and a time instance that the code was generated. Accordingly, the code can be unique to the device and the time. The technician can position the mobile device 108 such that the code is within a field of view of an imaging component (e.g., camera) of the mobile device 108. Stated differently, the code can be scanned by the mobile device 108.

Scanning the code can cause the mobile device 108 to establish a connection with the external server 110. The external server 110 can be provided by a commercial entity that produced the detector 104. The external server 110 can be provided by a commercial entity that controls, services, and/or governs the detector 104. The external server 110 can communicate to the mobile device 108 one or more functionalities that can be enabled on the detector 104 based on a type of the detector 104 and/or a nature of the facility 102. The mobile device 108 can display the functionalities in a selectable manner.

In some embodiments, functionalities can be licensed from the commercial entity for a particular fee. This fee may be displayed in conjunction with each respective functionality. The values, durations, and other parameters of such licenses can be configured by the commercial entity and may vary with seasonality and/or demand. Selection of a particular functionality can cause the display of a license agreement to which the technician may agree by any suitable input. An interface for providing payment for the license can be provided to the mobile device 108. Payment can be made by any suitable process.

Responsive to the agreement of the license and/or the payment, the license to the desired functionality is legally acquired by the technician. In some embodiments, the license expires after a particular period of time. The duration of this period can vary according to the nature of the functionality and/or the license price paid, for instance. In some embodiments, the license does not expire.

In order for the detector 104 to utilize the licensed functionality, a license key can be communicated from the external server 110 to the mobile device 108. The license key can be a numeric key, for instance, though embodiments of the present disclosure are not so limited. The license key can be communicated from the mobile device 108 to the detector 104. In some embodiments, the technician can read the license key off the mobile device 108 and input the license key into the detector 104 via the UI 106. In some embodiments, the license key can be communicated between the devices electronically (e.g., through a wired or wireless connection). Verification of the received license key by the detector 104 "unlocks" the previously disabled functionality such that it is available for use by the detector 104. Accordingly, the example high fan speed setting may be added to the UI 106 such that the technician can activate it and cause the fan to operate at the higher speed. In some embodiments, the license can be canceled via a similar process where the payment may be refunded and the functionality disabled by a different license key.

Figure 2:
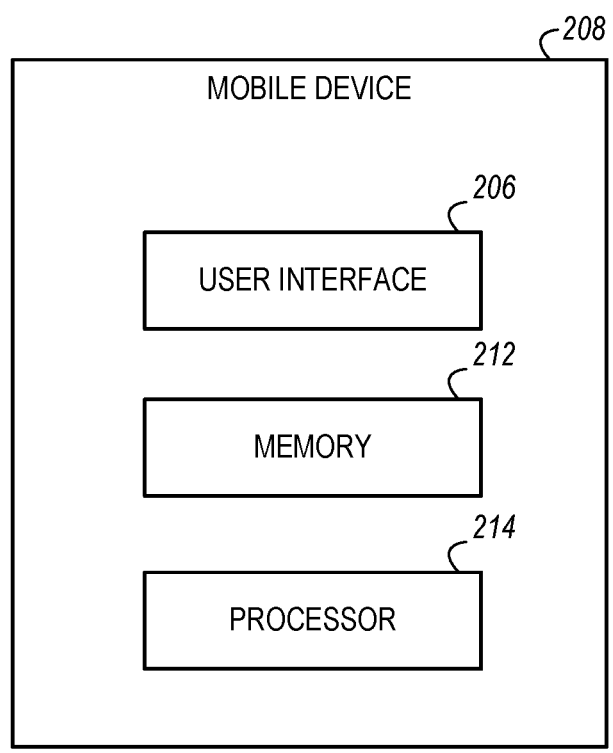
FIG. 2 is a mobile device for aspirating detector device functionality licensing in accordance with the present disclosure.

FIG. 2 is a mobile device 208 for aspirating detector device functionality licensing in accordance with the present disclosure. As illustrated in FIG. 2, the mobile device 208 can include a user interface 206, memory 212, and a processor 214.

The mobile device 208 can be, for example, a device that is (or can be) carried and/or worn by a user. For example, the mobile device 208 can be a phone (e.g., a smart phone), a tablet, a personal digital assistant (PDA), smart glasses, and/or a wrist-worn device (e.g., a smart watch), among other types of mobile devices.

The memory 212 can be any type of storage medium that can be accessed by the processor 214 to perform various examples of the present disclosure. For example, the memory 212 can be a non-transitory computer readable medium having computer readable instructions (e.g., computer program instructions) stored thereon that are executable by the processor 214 for aspirating detector device functionality licensing in accordance with the present disclosure.

The memory 212 can be volatile or nonvolatile memory. The memory 212 can also be removable (e.g., portable) memory, or non-removable (e.g., internal) memory. For example, the memory 212 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 212 is illustrated as being located within mobile device 208, embodiments of the present disclosure are not so limited. For example, memory 212 can also be located internal to another computing resource (e.g., enabling computer readable instructions to be downloaded over the Internet or another wired or wireless connection).

As illustrated in FIG. 2, the mobile device 208 includes a user interface 206. For example, the user interface 206 can display a desired detector functionality. A user (e.g., operator) of the mobile device 208 can interact with the mobile device 208 via the user interface 206. For example, the user interface 206 can provide (e.g., display and/or present) information to the user of mobile device 208, and/or receive information from (e.g., input by) the user of mobile device 208. For instance, in some embodiments, user interface 206 can be a graphical user interface (GUI) that can provide and/or receive information to and/or from the user of the mobile device 208. The display can be, for instance, a touch-screen (e.g., the GUI can include touch-screen capabilities). Alternatively, a display can include a television, computer monitor, mobile device screen, other type of display device, or any combination thereof, connected to the mobile device 208 and configured to receive a video signal output from the mobile device 208.

The user interface 206 can be localized to any language. For example, the user interface 206 can display information in any language, such as English, Spanish, German, French, Mandarin, Arabic, Japanese, Hindi, etc.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A system, comprising:
   an aspirating detector device configured to display a machine-readable code via an interface responsive to an input; and
   a mobile device configured to:
      scan the code;
      establish a connection with a remote server responsive thereto; and
      receive a license and a license key corresponding to a licensed aspirating detector device functionality from the remote server via the connection; and
   wherein the aspirating detector device is configured to enable the licensed functionality responsive to an entry of the code via the interface.

2. The system of claim 1, wherein the machine-readable code is a quick response (QR) code.

3. The system of claim 1, wherein the input is made using a keypad of the aspirating detector device.

4. The system of claim 3, wherein the entry of the code is made using the keypad.

5. The system of claim 1, wherein the aspirating detector device is configured to display the machine-readable code via an organic light-emitting diode (OLED) display.

6. The system of claim 1, wherein the mobile device is configured to receive an input corresponding to a selection of the licensed functionality from among a plurality of licensed functionalities.

7. The system of claim 1, wherein the code is cryptographically generated and is unique to the aspirating detector device and to a time associated with its generation.

8. The system of claim 1, wherein the aspirating detector device is configured to enable the licensed functionality for a particular period of time according to the license received from the remote server.

9. The system of claim 1, wherein the licensed functionality corresponds to a detection capability of the aspirating detector device.

10. The system of claim 1, wherein the licensed functionality corresponds to a fan speed associated with the aspirating detector device.

11. The system of claim 1, wherein the aspirating detector device lacks a connection to the Internet.

12. A mobile device for aspirating detector device functionality licensing, comprising:
   a memory;
   a processor configured to execute executable instructions stored in the memory to:
      scan a machine-readable code displayed by an aspirating detector device;
      establish a connection with a remote server responsive thereto; and
      receive a license and a license key corresponding to a licensed aspirating detector device functionality from the remote server via the connection.

13. The mobile device of claim 12, wherein the mobile device is configured to receive the license and the license key responsive to communicating a payment to the remote server.

14. The mobile device of claim 12, wherein the mobile device is configured to receive the license and the license key responsive to an acceptance of a license agreement associated with the functionality.

15. The mobile device of claim 12, wherein the mobile device is configured to receive inputs allowing a user to browse a plurality of licensed aspirating detector device functionalities.

16. The mobile device of claim 15, wherein the license key is time limited.

17. A non-transitory machine-readable medium having instructions stored thereon which, when executed by a processor, cause the processor to:
   establish a connection with a mobile device in a facility responsive to a scan, by the mobile device, of a machine-readable code displayed by an aspirating detector device;
   receive, from the mobile device, an indication of a desired licensed functionality modification to the aspirating detector device; and
   communicate, to the mobile device, a license and a license key corresponding to the desired licensed functionality modification.

18. The medium of claim 17, including instructions to provide a plurality of selectable licensed aspirating detector device services in addition to the desired functionality modification.

19. The medium of claim 18, wherein the plurality of selectable licensed aspirating detector device services includes:
   time-limited functionalities;
   maintenance support services;
   remote configuration services; and
   analytics services.

20. The medium of claim 17, wherein the license is configured to expire in one year.

* * * * *